(12) United States Patent
Seth et al.

(10) Patent No.: US 8,475,909 B2
(45) Date of Patent: *Jul. 2, 2013

(54) THREE-DIMENSIONAL REVERSE TANKING MEMBRANES

(75) Inventors: Jyoti Seth, Andover, MA (US); Jay Kellett, Reading, MA (US); Makam S. Chetan, Westford, MA (US); Neal S. Berke, Chelmsford, MA (US)

(73) Assignee: W. R. Grace & Co. —Conn., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,951

(22) Filed: May 2, 2011

(65) Prior Publication Data

US 2011/0214797 A1  Sep. 8, 2011

Related U.S. Application Data

(63) Continuation of application No. 10/921,737, filed on Aug. 19, 2004, now Pat. No. 7,968,171.

(60) Provisional application No. 60/549,702, filed on Mar. 3, 2004.

(51) Int. Cl.
 *B32B 9/00* (2006.01)

(52) U.S. Cl.
 USPC .......................................... 428/174; 428/141

(58) Field of Classification Search
 USPC ................................. 428/174, 141
 See application file for complete search history.

(56) References Cited

U.S. PATENT DOCUMENTS

| | | |
|---|---|---|
| 3,087,515 A | 4/1963 | Venable |
| 3,207,619 A | 9/1965 | Kimboff |
| 3,642,559 A | 2/1972 | Stokes |
| 3,661,695 A | 5/1972 | Berliner |
| 3,663,350 A | 5/1972 | Stokes |
| 3,741,856 A | 6/1973 | Hurst |
| 3,819,394 A | 6/1974 | Schnebel, Jr. et al. |
| 3,853,682 A | 12/1974 | Hurst |
| 3,900,102 A | 8/1975 | Hurst |
| 4,065,924 A | 1/1978 | Young |
| 4,091,135 A | 5/1978 | Tajima et al. |
| 4,151,025 A | 4/1979 | Jacobs |
| 4,357,377 A | 11/1982 | Yamamoto |

(Continued)

FOREIGN PATENT DOCUMENTS

| | | |
|---|---|---|
| CA | 0989257 | 5/1976 |
| EP | 0501838 | 9/1992 |

(Continued)

OTHER PUBLICATIONS

Bituthene.RTM. Pre-Pour Membrane.TM.; "The First Truly Effective Blind Side Waterproofing System," W. R. Grace (Oct. 1993).

(Continued)

*Primary Examiner* — Michael C Miggins
(74) *Attorney, Agent, or Firm* — Stephan P. Williams; Craig K. Leon

(57) ABSTRACT

Shaped waterproofing membranes having three-dimensional contours are useful for the "reverse tanking" waterproofing of detail areas such as those presented by "tiebacks," pipes, pile caps, and other irregularities that occur on concrete formworks and other civil construction or building surfaces. A preferred method for making such membranes is to thermoform a membrane laminate, having a carrier support sheet, waterproofing adhesive, and optionally a protective coating layer, as a single unit.

17 Claims, 4 Drawing Sheets

U.S. PATENT DOCUMENTS

| | | |
|---|---|---|
| 4,374,687 A | 2/1983 | Yamamoto |
| 4,386,981 A | 6/1983 | Clapperton |
| 4,421,807 A | 12/1983 | Clausing et al. |
| 4,452,850 A | 6/1984 | Even et al. |
| 4,464,215 A | 8/1984 | Cogliano |
| 4,518,643 A | 5/1985 | Francis |
| 4,588,458 A | 5/1986 | Previsani |
| 4,589,804 A | 5/1986 | Paeglis et al. |
| 4,636,414 A | 1/1987 | Tajima et al. |
| 4,657,435 A | 4/1987 | Chang |
| 4,670,071 A | 6/1987 | Cooper et al. |
| 4,755,409 A | 7/1988 | Harkness |
| 4,775,567 A | 10/1988 | Harkness |
| 4,789,578 A | 12/1988 | Twyford et al. |
| 4,810,573 A | 3/1989 | Harriett |
| 4,837,095 A | 6/1989 | Hageman |
| 4,948,652 A | 8/1990 | Kelleher et al. |
| 4,994,328 A | 2/1991 | Cogliano |
| 5,008,151 A | 4/1991 | Tominaga et al. |
| 5,032,197 A | 7/1991 | Trimble |
| 5,096,775 A | 3/1992 | Sato et al. |
| 5,132,183 A | 7/1992 | Gaidis et al. |
| 5,145,748 A | 9/1992 | Gaidis et al. |
| 5,178,946 A | 1/1993 | Sato et al. |
| 5,204,148 A | 4/1993 | Alexander et al. |
| 5,206,068 A | 4/1993 | Kalkanoglu |
| 5,226,372 A | 7/1993 | Frenkel et al. |
| 5,227,221 A | 7/1993 | Hedblom |
| 5,271,781 A | 12/1993 | Anno et al. |
| 5,316,848 A | 5/1994 | Bartlett et al. |
| 5,496,615 A | 3/1996 | Bartlett et al. |
| 5,687,517 A | 11/1997 | Wiercinski et al. |
| 6,541,098 B2 | 4/2003 | Venkatasanthanam et al. |

FOREIGN PATENT DOCUMENTS

| | | |
|---|---|---|
| EP | 1193283 | 4/2002 |
| GB | 2340070 | 2/2000 |
| WO | 9102847 | 3/1991 |

OTHER PUBLICATIONS

Hutton, Daivd, Supplementary European Search Report, Aug. 3, 2010.

THREE-DIMENSIONAL REVERSE TANKING MEMBRANES

CROSS-REFERENCE TO RELATED APPLICATION

This application is a continuation of U.S. application Ser. No. 10/921,737, filed on Aug. 19, 2004, now U.S. Pat. No. 7,968,171, and claims the benefit of U.S. Provisioal Application No. 60/549,702 filed on Mar. 3, 2004.

FIELD OF THE INVENTION

The present invention relates to reverse tanking waterproofing membranes which bond to freshly poured concrete, and more particularly to membranes having three-dimensional contours for creating unified moisture barriers in and around detail areas and other surface irregularities.

BACKGROUND OF THE INVENTION

Waterproofing membranes having flexible plastic sheets for carrying a preformed, pressure-sensitive adhesive layer have been used for a number of years to provide protection to existing building surfaces. The adhesive layers are typically made of rubber-modified bitumen, which is aggressively sticky, and is covered by a release sheet that is removed before attaching the membrane to the substrate surface.

A technique for "reverse tanking" waterproofing is described in U.S. Pat. No. 4,994,328 of Cogliano (bituminous adhesive) and U.S. Pat. No. 5,316,848 of Bartlett et al. (non-bituminous synthetic adhesive). According to this technique, the waterproofing membrane is first attached with the back side of its carrier sheet against a "formwork" (i.e., concrete mold usually formed by wooden boards joined together). Consequently, the waterproofing adhesive layer faces outwards. A concrete structure is created by casting concrete against the membrane-covered formwork surface, and this may be referred to as "post cast" or "post applied" concrete. The adhesive layer is covered by an elastomeric protective coating layer, a particle coating layer, or mixture or arrangement of both (i.e., either individually, mixed together as one layer, or arranged as discrete layers), to protect the adhesive from dirt and damage. This protective coating layer (whether of polymeric or particle coating) also operates to decrease the tack of the adhesive. The outer surface is further protected by a release sheet liner (that must be removed before fresh concrete is poured against the adhesive/protective coating layers). After curing, the concrete is bonded with the adhesive/protective coating layers, and thus a waterproofing bond is achieved in "reverse" order.

Hence, in the world of "reverse tanking" waterproofing, it can be said that the waterproofing is "pre-applied" because it precedes the concrete structure; and, in turn, the concrete is said to be "post cast" or "post applied" because it follows installation of waterproofing.

Reverse tanking is further discussed in U.S. Pat. Nos. 5,496,615 and 6,500,520 which teach using particle coating layers. In the '615 patent, inorganic particles are used to resist foot traffic when the membrane is installed on a horizontal surface. In the '520 patent, particles are applied on top of an adhesive layer to enhance bonding with concrete by reacting with calcium hydroxide generated during hydration of cement.

One of the difficulties of reverse tanking is achieving continuity of waterproofing in detail areas (i.e., surface irregularities), and especially in "tieback" detailing. Tiebacks are the terminal ends of rods or cables supporting the formwork and found protruding at intervals through the formwork surface. Other surface irregularities include penetration areas, such as where pipes or pile caps extend through the formwork.

FIG. 1 illustrates the present process used in the industry for waterproofing "tiebacks" on concrete formworks. Drainage mats or sheets, which usually involve a fabric attached to a cuspated core sheet, are placed against the wooden formwork, and covered by sheets of reverse tanking waterproofing membrane, previously described above. Such sheet materials are available from Grace Construction Products, Cambridge, Mass., under the trademarks HYDRODUCT® (drainage) and PREPRUFE® (waterproofing membranes). These sheet materials are required to be cut and arranged to surround the area on the formwork occupied by the tieback, which can be as large as a man's chest.

As shown in FIG. 1, a wooden or metal box must be fabricated and fitted over the tieback. The box is fastened to the formwork, such as by screws and brackets, with a bead of adhesive for sealing around the edges against the formwork. The box is filled with liquid mastic or mortar cement to prevent twisting or collapse of the box due to the poured concrete.

As shown in FIG. 2, the box is covered with waterproofing strips. The strips are available as a double-sided adhesive "tape" from Grace Construction Products under the PREPRUFE® brand name. One side has a tacky adhesive that sticks onto the box and surrounding formwork; the other side has a coated adhesive layer for bonding to post cast concrete. Although FIGS. 1 and 2 illustrate a finished tape "box" shape, the actual waterproofing of the box with strips requires painstaking labor. The tape strips must be overlapped to provide a continuous barrier over and around the tieback. Fabricating, fastening, and waterproofing each box at a tie back detail requires about 30 minutes or more. In formwork installations that exceed one thousand square feet, one may confront one hundred tiebacks. Providing waterproofing for such detail areas as these would thus require days of labor.

In view of the foregoing disadvantages, a novel method and waterproofing membrane system are needed for decreasing labor costs in waterproofing installations wherein tiebacks, pipe penetrations, pile cap penetrations, and other surface irregularities are encountered.

SUMMARY OF THE INVENTION

In surmounting prior art disadvantages, the present invention provides "reverse tanking" waterproofing for detail areas and other surface irregularities. An exemplary waterproofing membrane of the invention, having a three-dimensional contour surrounded entirely or partially by a flat collar portion, can be positioned over tiebacks or other surface irregularities, and seamed with conventional reverse tanking membranes to provide a continuous waterproofing barrier. Preferably, such shaped membranes are used in combination with correspondingly shaped molded support structures to prevent the membranes from collapsing under the weight of post cast concrete (i.e., concrete which is cast against them after they are installed).

In an exemplary method of the invention, a molded rigid plastic or metal dome is positioned over a tieback and fastened to the formwork, and a "shaped" waterproofing membrane having a corresponding dome shape is fitted over the support and seamed with adjacent "sheet-form" waterproofing membranes on the formwork to provide a continuous moisture barrier. The term "shaped" will be used to define the reverse tanking membranes of the invention, in contrast to the term "sheet-form" which will be used to define conventional reverse tanking membranes (typically supplied in roll form).

As another example, a waterproofing membrane having a three-dimensional shape, such as a circular- or conical-shaped sleeve, surrounded by a contiguous flat collar portion, may be employed for waterproofing around penetrations such as pipes and pile caps. Three-dimensional shaped waterproofing membranes, having shapes such as domes, cones, cylinders, pyramids, or other three-dimensional forms, will save several steps otherwise needed for providing a continuous barrier at penetration joints. Such membranes may have at least one or both major faces coated with one or more conventional waterproofing adhesive layers (e.g., rubberized asphalt, synthetic polymeric adhesives, clay-based adhesives, etc.) which are operative to bond with fresh concrete.

The present invention is also directed to waterproofed structures formed by the methods described herein, as well as to shaped waterproofing membranes and methods for making such membranes. An exemplary method for making shaped membranes comprises: providing a laminate having a carrier support sheet and, contiguous therewith, a continuous pressure-sensitive waterproofing adhesive layer, with optionally a protective polymeric coating layer and/or particle coating layer over the adhesive layer; and molding the laminate as one piece to provide a shaped waterproofing membrane having a three-dimensional contour that is entirely or partially surrounded by a flat collar portion. Preferably, the carrier support sheet comprises a polyolefin blend that is operative to be molded below 300° F. More preferably, the support sheet comprises a blend of LDPE and HDPE resin, and the pressure-sensitive adhesive is a non-bituminous synthetic adhesive (e.g., SIS).

The choice of materials is such that the laminate may be thermally molded into a three-dimensional contour at temperatures below 300° F., and more preferably below 250° F., without destroying the continuity of the pressure-sensitive adhesive layer or protective coating layer, nor the ability of these layers to provide a waterproofing bond with post cast concrete.

Other advantages and features of the invention are discussed in further detail hereinafter.

DETAILED DESCRIPTION OF EXEMPLARY EMBODIMENTS

The waterproofing systems described herein are intended to bond with fresh cementitious compositions that are cast against them and allowed to harden. Cementitious compositions, such as concrete or mortar cement, which is applied this way to the waterproofing membranes, are sometimes referred to as being "post cast" or "post applied."

The terms "cement" and "cementitious composition" are used to refer to dry powders as well as to pastes, mortars, grouts, and concrete compositions comprising a hydratable cement binder. The terms "paste", "mortar" and "concrete" are terms of art: pastes are mixtures composed of a hydratable cement binder (usually, but not exclusively, Portland cement, masonry cement, or mortar cement). Mortars are pastes additionally including fine aggregate (e.g., sand), and concrete are mortars additionally including coarse aggregate (e.g., crushed gravel, stone). Cementitious compositions are typically formed by mixing hydratable cement, water, and fine and/or coarse aggregate.

Figure 3:
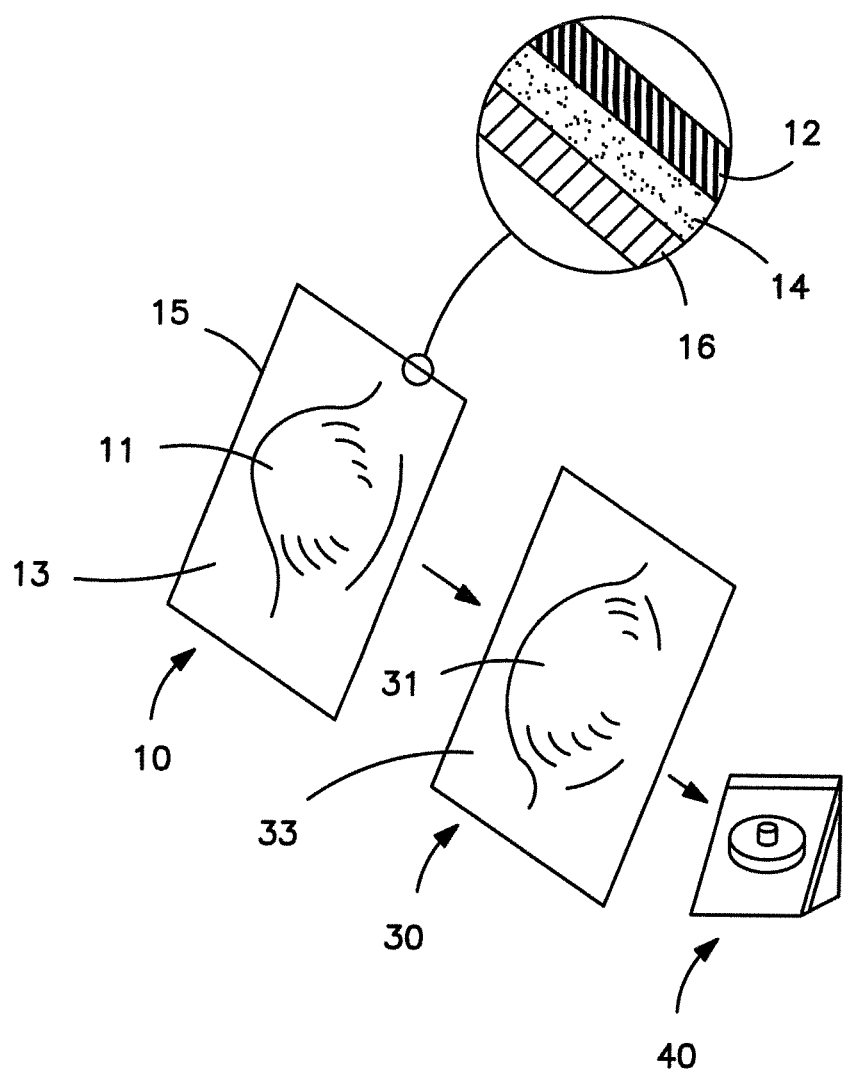
FIG. 3 is diagram of an exemplary shaped waterproofing membrane of the invention shown with an optional exemplary shaped supporting device for covering a tieback or other surface irregularity.

As shown in FIG. 3, an exemplary "shaped" waterproofing membrane 10 and optional exemplary supporting structure 30 can be used to provide a continuous waterproofing barrier over a tieback 40 or other surface detail on the construction surface before concrete is post cast against it.

As illustrated in the magnified view (enlarged circle) in FIG. 3, the waterproofing membrane 10 comprises at least one carrier support sheet 12 having first and second major opposing faces, and, attached to a first major face thereof, at least one continuous pressure-sensitive waterproofing adhesive layer 14 operative to bond with post cast concrete or mortar.

Optionally, but preferably, a protective layer 16, such as an elastomer coating, a particulate layer, or a mixture thereof (e.g., particles mixed into the elastomer) or arrangement thereof (e.g., discrete particle layer on top of or partially embedded into an elastomer layer) operates to protect the adhesive layer 14 from dirt and debris.

For example, the carrier support sheet 12, pressure-sensitive waterproofing adhesive layer 14, and optional protective layer 16 of the may comprise materials and incorporate thickness dimensions taught in U.S. Pat. Nos. 5,316,848 and 5,496,615 of Bartlett et al., wherein it was taught that the carrier support sheet may be fabricated from a thermoplastic, rubber, or metal in the form of a continuous film, a woven material, or a non-woven material. Thermoplastics particularly suited for use in the present invention include high density polyethylene (HDPE), polyethylene teraphthate (PET), polystyrene (PS), polyvinyl chloride (PVC), polyamides (PA), or combinations thereof.

While HDPE was the carrier support sheet material preferred by Bartlett et al., the present inventors prefer using, for making shaped waterproofing membranes 10 of the present invention, a carrier support sheet 12 in the form of a continuous film made from a polyolefin blend. Most preferably, the blend comprises low density polyethylene (LDPE) and high density polyethylene (HDPE). The carrier support sheet 12 can be made by sheet-extruding the polymer or polymer blend through a sheet die and/or calendaring the sheet between opposed rollers to achieve a relatively uniform thickness. Use of LDPE in the polyolefin blend is preferred due to increased ease of thermal molding (thermoforming). This is because the preferred method of the present invention involves thermoforming the carrier support sheet 12 and preformed waterproofing adhesive layer 14, and optionally a protective layer 16, altogether as one integral unit, e.g., as a unified laminate.

Other polyolefin blends may be possible for the carrier support sheet 12, such as very low density polyethylene (VLDPE) and HDPE or polypropylene.

While it is possible to mold the carrier support sheet 12 separately, followed by subsequently applying the waterproofing adhesive 14 and optional protective layer 16 as separate coatings, the use of thermal molding ("thermoforming") to obtain a three-dimensional shaped waterproofing membrane 10 from a unified laminate will save time and provide economic advantages. The thickness of the individual layers may change during thermoforming, which is the preferred method of making the shaped membranes, and so initial thicknesses of the layers should be chosen with this fact in mind.

For example, the waterproofing membrane laminate 10 can be manufactured by coating or extruding onto a paper or plastic release sheet (not shown) first the protective layer 16 (e.g., polymer coating), followed by coating or extruding the waterproofing adhesive layer 14 (e.g., SIS), and then the resultant laminate can be applied to the carrier support sheet 12; and the release sheet can be removed just before the membrane laminate 12/14/16 is thermoformed to provide the shaped waterproofing membrane 10. Alternatively, the adhesive layer 14 and protective layer 16 can be coated or extruded directly onto the carrier support sheet 12, and then the release sheet liner (not shown) can be applied, such as by calendaring it onto the laminate whereby the calendaring operation ensures a uniform total thickness of the membrane. In either case, the release sheet liner is removed before molding (e.g., thermoforming) of the membrane to provide the three-dimensional profile.

In still further exemplary methods and membranes of the invention, the adhesive layer 14 and protective coating layer 16 (polymeric) can be co-extruded simultaneously between a carrier support sheet 12 and release sheet. For example, a continuous operation may involve co-extruding the adhesive and protective coating layers between the carrier support sheet 12 and release liner as they are being fed between rollers which laminate them together. Again, the release sheet is used for purposes of making the laminate and protecting the adhesive/protecting coatings until the thermoforming stage, whereupon it is preferably removed and discarded.

In exemplary methods of the invention, the thermoforming stage should preferably involve temperatures under 300° F. in order to prevent damage to the pressure-sensitive adhesive layer (and protecting coating layer) which must retain integrity, sufficient thickness, and ability to bond with and to waterproof post cast concrete. It is preferable to subject the carrier support sheet 12 side of the membrane 10 to a temperature that is higher than the adhesive layer 14 side because it is the carrier support sheet 12 that primarily requires thermal softening for purposes of shaping, whereas the adhesive layer is more easily conformable and would require less heat for molding. The thickness of the carrier support sheet 12 is preferably 10-150 mils thick and more preferably 30-80 mils thick.

An exemplary three-dimensional contour 11, shown as a dome shape in FIG. 3, may have an average diameter and height of 10 cm-100 cm or larger, depending on the size of the surface detail, and is entirely or partially surrounded by a flat collar portion 13. The thickness and materials of the carrier support sheet 12 are chosen such that, in combination with the waterproofing adhesive layer 14 and protective coating layer 16, the average temperature needed for thermoforming the shaped membrane 10 (as a laminate) does not exceed 300° F. (all temperatures herein being described in degrees Fahrenheit).

Although the pressure-sensitive waterproofing adhesive layer 14 may comprise a bituminous adhesive, the present inventors prefer using synthetic non-bituminous adhesives. Such synthetic adhesives may include butyl rubber, polyisobutylene, polyisobutyl rubber, acrylic (or acrylate), vinyl ether based adhesives, styrene-isoprene-styrene (SIS), styrene-ethylene-butylene-styrene based (SEBS), styrene-butadiene-styrene (SBS), or mixtures thereof. Another possible adhesive is ethylene propylene diene monomer. Most preferred, however, are pressure-sensitive hot-melt adhesive block copolymers of SIS. Preferred adhesive layers should also withstand melting temperatures in the range between 160° F. and 300° F. (for a duration of between 2 seconds to 2 minutes) without losing their continuous layer form and without the adhesive layer 14 (and optional protective coating layer 16) losing the ability to provide a bond with post cast concrete.

The pressure sensitive adhesive layer 14 can optionally contain typical additives, such as light absorbers (i.e., carbon black, benzotriazoles, etc.), light stabilizers (i.e. hindered amines, benzophenones), antioxidants (i.e. hindered phenols), fillers (i.e. calcium carbonate, silica, titanium dioxide, etc.), plasticizers, rheological additives, and mixtures thereof. Preferred synthetic adhesive layers contain light absorbers, light stabilizers, and antioxidants.

As discussed in U.S. Pat. Nos. 5,316,848 and 5,496,615, the adhesion to post cast concrete is improved when the synthetic adhesive layer 14 has a penetration greater than about 30 decimillimeters (dmm) (150 g, 5 sec., 70° F.) as measured according to ASTM D 5-73, incorporated herein by reference. The "adhesive" nature of the synthetic pressure sensitive adhesive 14 has the added benefit in that side laps and end laps of the membrane 10 are easily formed. The average thickness of the synthetic adhesive layer may be 10-150 mils, more preferably 20-100 mils, with 50-100 mils being most preferred.

In preferred membranes and methods of the invention, the shaped waterproofing membrane 10 further comprises a protective coating layer 16 to decrease tack and to protect the adhesive 14 from dust, dirt and the elements (particularly sunlight). At the same time, the protective layer 16 does not defeat the ability of the membrane 10 to form a fully adhered strong bond with post cast concrete. The protective coating layer 16 may comprise, for example, a polymer coating, a layer of particulate matter, or a mixture thereof. Exemplary polymer coatings may comprise sytrene butadiene rubber based (SBR) coatings, carboxylated SBR based coatings, acrylic based coatings (e.g., an acrylate), polyvinylidene chloride based (PVDC) coatings, polyvinyl chloride based (PVC) coatings, ethylene vinyl acetate copolymer based (EVA) coatings, ethylene ethyl acetate copolymer based (EEA) coatings, polychloroprene based coatings, polyester based coatings, polyurethane based coatings, styrene-isoprene-styrene based (SIS) coatings, styrene-butadiene-styrene based (SBS) coatings, styrene-ethylene butylene-styrene based (SEBS) coatings, or a mixture thereof.

Preferred protective coating layers 16 are acrylic based coatings, and most preferred are styrene butylacrylate based coatings. Protective layers 16 which are elastomeric in nature are preferred. As used herein, the term "elastomeric" means and refers to an elastic polymer having a property similar to those of vulcanized natural rubber; namely, to stretch when pulled and to retract rapidly to approximately original length when released. Elastomeric acrylic based coatings are preferred, and elastomeric styrene butylacrylate based coatings are most preferred. The average thickness of the protective layer 16 may be anywhere from 1-80 mils, and more preferably 5-60 mils.

The protective layer 16 may optionally contain typical additives and have a penetration value similar to those described for the pressure-sensitive adhesive layer 14 described above. Protecting layers 16 made from polymeric materials (e.g., butyl acrylate) preferably include titanium dioxide or zinc oxide for protection from sunlight, as well as fillers (e.g., talc, calcium carbonate, sand, slate dust) to enhance scuffing- and abrasion-resistance.

As just mentioned, the protective layer 16 may comprise inorganic particles which are roll pressed onto the waterproofing adhesive layer 14 (where no polymer protective coating is used) and/or mixed into the a polymer protective coating 16 material. A number of particulate materials believed suitable for this purpose are catalogued in U.S. Pat. No. 5,496,615 of Bartlett et al. and U.S. Pat. No. 6,500,520 of Wiercinski and Seth, as previously referenced above. For example, Bartlett et al. disclosed particles of calcium carbonate, cement, talc, sand, granite dust, slate dust, clay, titanium dioxide, and carbon black; while Wiercinski and Seth disclosed particles of aluminum oxide trihydrate, silica dioxide, fly ash, blast furnace slag, silica fume, alkali or alkaline earth metal nitrites, nitrates, halides, sulfates, hydroxides, carboxylates, silicates, aluminate, or mixtures thereof. Combinations of such particles (e.g., calcium carbonate and talc) are also contemplated.

Thus, the protective coating 16 layer may be made of a polymeric coating applied as a liquid and allowed to dry; may be made of a mixture of polymeric coating material having particulates and/or other additives incorporated into the polymer; or may be made solely of particles that are applied by rolling them onto and embedding the particles entirely or partially into the outer adhesive layer 14 and/or outer polymer coating layer 16.

As shown in FIG. 3, an exemplary shaped waterproofing membrane 10 preferably has a three-dimensional contour 11 such as as a dome, surrounded partially or entirely by a flat collar portion 13. The flat collar portion 13 has edges (such as designated at 15) which are preferably straight in nature to permit a waterproofing tape to be used conveniently to provide a water-tight seam with "sheet-form" (i.e., conventional reverse tanking) waterproofing membranes on the formwork or other substrate surface.

As shown in FIG. 3, an exemplary supporting structure 30 has a corresponding dome shape 31 also is entirely or partially surrounded by a flat collar portion 33 useful for fastening the structure 30 onto a formwork or other mounting surface. The support structure 30 may be thermoformed or stamped from a thermoplastic sheet material, such as ABS high impact polystyrene, poly(vinyl)chloride, polypropylene polyethylene, and others. The support structure may also be made from sheet metal such as steel, (e.g., stainless) aluminum, copper, tin, or other metals. Many of these metals can be thermoformed or stamped into shape relatively conveniently. The average thickness of the support structure 30 is about 10-200 mils and more preferably 20-100 mils. While various thermoplastics may be used, such as polyvinyl chloride (PVC), some materials such as high density polyethylene, while thermoformable, may require extra thickness in order to withstand the force of post cast concrete, and this extra thickness may present manufacturing difficulties during thermoforming because the added thickness will require higher melting temperatures or longer dwell time (in a heated mold) to soften the plastic, and this could lead to excessive heating and scorching of the material. Thus, preferred thickness will often depend upon the choice of material.

The thermoplastic material used for the support structure 30 should ideally withstand nails, staples, or other fasteners being driven through the flat collar portion to secure the structure to formwork. This does not rule out using brittle materials which shatter, however, because such materials can also be attached using alternative means (e.g., adhesives, drilled holes, etc.). In addition to dome or hemispherical shapes, other thermoformed or stamped three-dimensional shapes such as cylinders, boxes, pyramids, etc., can be employed, but dome shapes are preferred because they are least vulnerable to distortion or twisting caused by the wet concrete or mortar cast against the membrane-covered 10 supporting structure 30. Furthermore, a rounded shape provides better flow of the concrete around the support structure (30), thus better enabling the consolidation of the concrete, and improving or ensuring bonding between the concrete and support structure (30). It is preferable to have fewer sharp edges or creases which may lead to weaknesses in the surrounding concrete.

Although the support structure 30 (dome) may be filled with material, such as a polyurethane foam or mortar cement, to resist collapsing under the weight of concrete, it is believed that the thickness of the support material and the material chosen (e.g., synthetic polymer, metal, or combination thereof) may be such as to allow the support structure 30 by itself, without filling its cavity, to support the weight of post cast concrete. Nevertheless, for extremely large formwork installations, wherein pressures of huge volumetric amounts of post cast concrete are involved, it may be necessary to fill dome structures 30 particularly at the bottom of the formwork where pressures may be greatest, but this can be conveniently accomplished such as by drilling a small hole in an installed dome, filling the dome through the hole with material (e.g., polyurethane foam which becomes rigid), and then sealing the hole with two-sided PREPRUFE® tape.

In preferred methods of the invention, the supporting structure 30 is molded using the same mold as used for providing the three-dimensional contour in the shaped waterproofing membrane 10 (to be further described below).

The supportive dome structure 30, which similarly has a three-dimensional contour portion 31 surrounded entirely or partially by a flat collar portion 33, serves not only to support the shaped waterproofing membrane 10 when it is installed over a tieback 40 or other surface detail, but also serves for protecting the similarly shaped membrane 10 during shipment. For example, the supportive dome structure 30 can be placed into a box situated on the outer first face of the membrane 10 to protect the adhesive side of the membrane (i.e., the rigid dome is placed over the soft dome), and thus the shaped membrane 10 is "tucked under the hat," so to speak. At the construction site, the order is reversed, with the supportive dome structure 30 being fitted over the tieback and fastened onto the formwork 40 or other substrate surface by nails or other fasteners driven through the flat collar portion 33 and into the underlying formwork, and then this is followed by fitting the shaped waterproofing membrane 10 over the dome support 30. The membrane 10 can be attached it to the supporting dome structure 30 and/or surrounding formwork or adjacent conventional membranes by any means known, such as by using a conventional mastic or other adhesive.

It is envisioned that shaped membranes 10 with domes 30 of corresponding size can be packaged together as sets, much in the manner of stacking identically shaped hats or bowls. Moreover, such membrane/support sets can be variously sized (in the manner of stainless steel salad bowl sets) for situations wherein various-sized tiebacks or other surface irregularities are encountered.

Accordingly, in a further exemplary embodiment, a plurality of shaped waterproofing membranes 10 are fitted with correspondingly shaped support structures 30 within the same packaging (e.g., shipping) carton or box, similar to the way in which dispensable paper drinking cups are sold stacked together in packaging. Preferably, each shaped membrane 10 is fitted into its corresponding support structure 30, and this "set" can be fitted within another "set" and thus easily removed from the packaging carton, one set at a time, as the need dictates. Moreover, the ability to stack the "shaped"

membranes allows them to be conveniently shipped or transported alongside the "sheet-form" membranes with which they will be used for typical reverse tanking applications. For example, a shipment of both "shaped" and "sheet-form" (conventional) membranes (supplied in roll form in carton) can be bundled together (such as by using plastic wrapping, binding materials, etc) for transport the cartons together conveniently to the construction site.

Alternatively, rigid domes (or other three-dimensional shapes) can be used as the waterproofing membranes themselves, such as by first stamping or thermoforming a rigid sheet into the desired three-dimensional shape (e.g., dome or pyramid surrounded by one or more collar portions or flanges), and subsequently this structure is coated or layered with a coating for bonding to fresh concrete. For example, the coating may comprise rubberized asphalt, a synthetic polymer adhesive (e.g., SIS, SEBS, acrylic, polyurethane, etc.), a clay based adhesive (e.g., bentonite, smectite), or mixture thereof.

Figure 1:
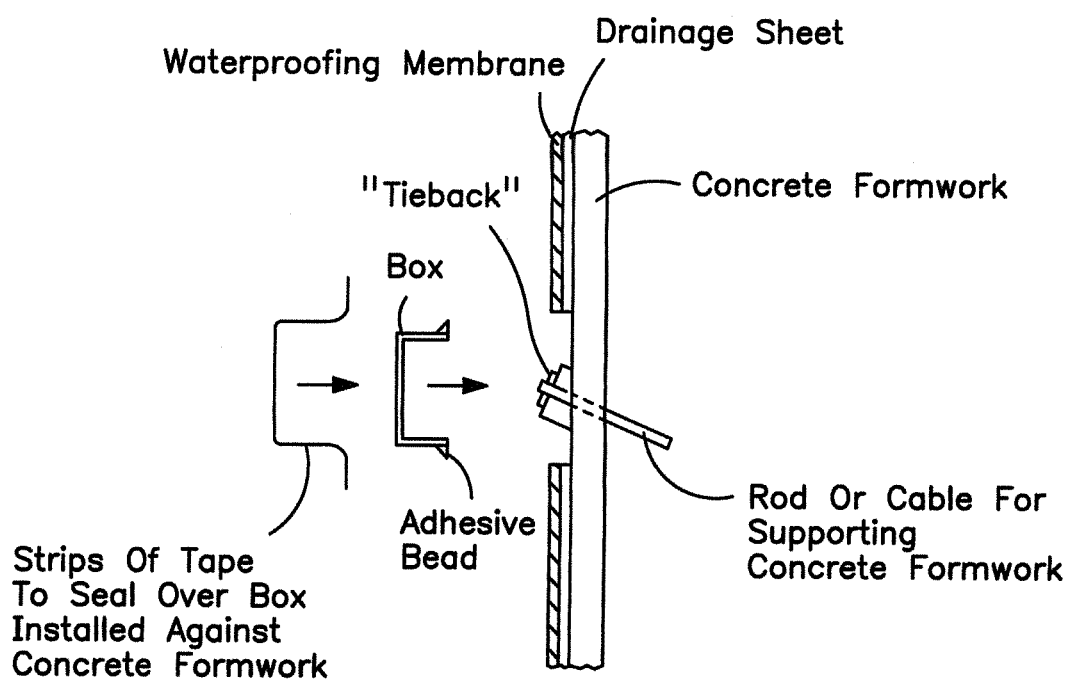
FIG. 1 is an exploded, side-view plan diagram of a PRIOR ART method for waterproofing detailed areas, such as tiebacks, in a concrete formwork.
Figure 2:
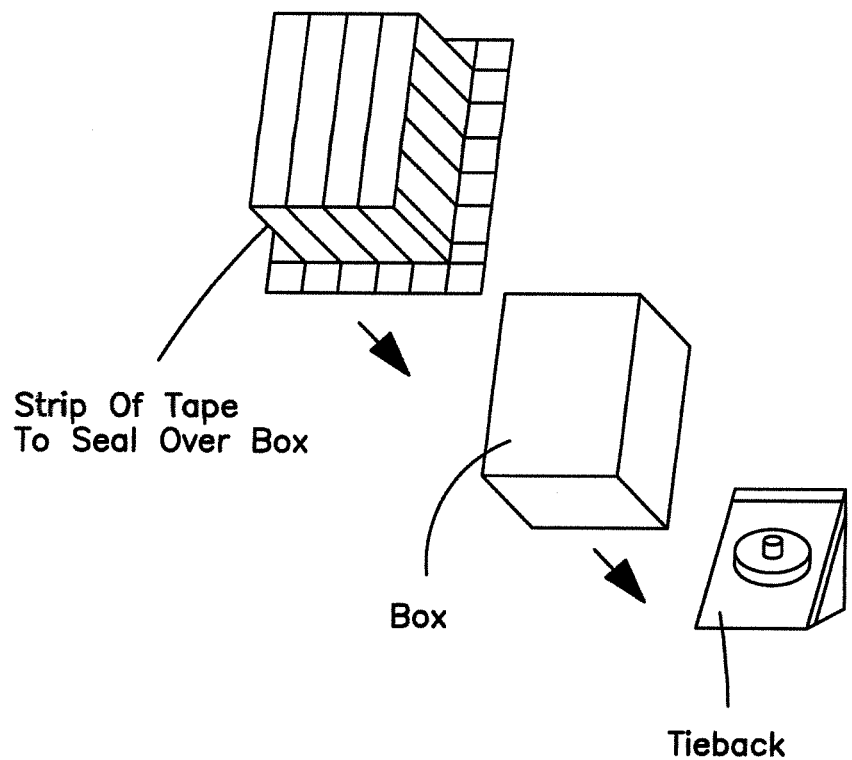
FIG. 2 is another perspective plan diagram of the PRIOR ART method illustrated in FIG. 1.

The outer edges 15 of the shaped waterproofing membrane 10 are preferably straight so that the membrane can be conveniently overlapped with those of a conventional reverse tanking waterproofing membrane. Furthermore, the shaped membrane 10 (FIG. 3) and conventional membranes installed onto the formwork (See e.g., FIG. 1 PRIOR ART) can be seamed together by using two-sided reverse tanking tape (e.g., Grace PREPRUFE tape) to provide a continuous barrier between and around the area surrounding the tieback 40.

In further exemplary embodiments of the invention, it is possible to provide a membrane that combines the properties of both the shaped membrane 10 and support structure 30, such as by coating the waterproofing adhesive layer 14 directly onto a rigid three-dimensional contour surrounded entirely or partially by a flat collar portion, followed by optionally coating a protective coating layer onto the adhesive layer. This method is less desirable than thermoforming a single laminate because it would be more time-consuming to make (at the plant) or assemble (at the construction site).

In this connection, the present inventors believe that it will be most convenient for applicators to fasten a thermoformed dome support 30 in place over the tieback (e.g., by nailing the flat collar portion into the formwork); and then to cover the support dome with a correspondingly "shaped" waterproofing membrane 10 that is easily sealed with "sheet-form" (conventional) reverse tanking membranes: using just four strips of tape. The installation time is estimated to only a few minutes, from removal of the pieces from the shipping carton. This is far less than what is required by present industry practice as earlier described in the background.

The present invention therefore relates to the provision of a unified waterproofing barrier by providing a shaped waterproofing membrane 10, and relates to a well as the method for constructing such unified barriers on building and civil engineering surfaces using the shaped membrane 10 in combination with "sheet-form" (conventional) reverse tanking membranes.

With this distinction between conventional "sheet-form" and "shaped" reverse tanking membranes in place, an exemplary method of the invention comprises: providing at least one "sheet-form" waterproofing membrane comprising a carrier support sheet with first and second opposed major faces, and, disposed over a first major face thereof, a pressure-sensitive adhesive layer operative to bond with post cast concrete; and providing at least one "shaped" waterproofing membrane (e.g., FIG. 3) comprising a carrier support sheet 12 having first and second opposed major faces, and, disposed over a first major face thereof, a pressure-sensitive waterproofing adhesive layer 14 operative to bond with post cast concrete, the shaped membrane having a three-dimensional contour 11 surrounded (entirely or partially) by a flat collar portion 13 operative to overlap and form seams with the at least one sheet-form waterproofing membrane.

Preferably, both the sheet-form and shaped waterproofing membranes further comprise a protective coating layer 16, such as an elastomeric polymeric coating and/or a particle layer. More preferably, the carrier support sheet 12, adhesive layer 14, and protective layer 16 of the shaped membrane 10 are thermoformed together as a single piece laminate.

In further exemplary methods, a support structure 30, preferably molded from the same mold used for thermoforming the shaped waterproofing membrane 10, is first installed onto a formwork or other mounting surface, so that the shaped membrane can be positioned over the installed support structure 30.

Figure 4:
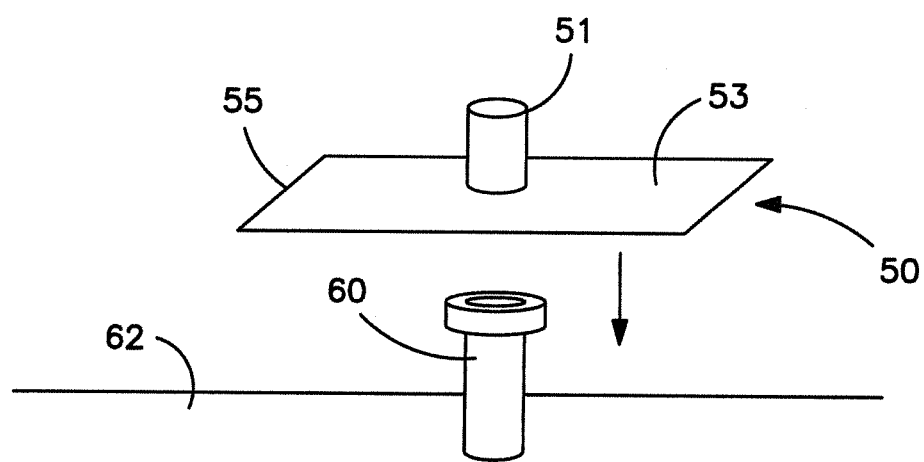
FIG. 4 is a diagram of another exemplary shaped waterproofing membrane of the invention.

FIG. 4 illustrates another exemplary shaped waterproofing membrane 50 of the invention which is installed around a penetration 60 (e.g., pipe) in the building or civil construction surface 62. In this case, the three-dimensional contour 51 is cylindrically shaped and surrounded by a flat collar portion 53 molded from the same sheet material. The outer surface of the cylinder 51 and upper face of the flat collar portion 53 are covered by a waterproofing pressure sensitive adhesive and optional protective coating (similar to the layers illustrated in magnified view in FIG. 3). The flat collar portion 53 has preferably straight edges (as designated at 55) to provide quick seaming, using conventional two-sided reverse tanking tape (e.g., PREPRUFE® brand), with "sheet-form" (conventional) reverse tanking membranes (not shown) that may be installed on the substrate surface 62.

In a further exemplary embodiment, the cylinder form 51 can be replaced by a cone shape. The top of the cone can be cut at the desired cone height to achieve an opening diameter corresponding to the diameter or size of the object (pipe 60, pile cap, etc.) to be waterproofed. The use of the three-dimensional cylinder shape 51 (FIG. 4) or cone shape will also save considerable labor at the construction site.

The foregoing embodiments and illustrations are provided for illustrative purposes only.

It is claimed:

1. A pre-formed, shaped waterproofing membrane comprising a carrier support sheet having first and second opposed major faces and, disposed over said first major face, a pressure-sensitive waterproofing adhesive layer operative to bond with post cast concrete, said shaped membrane having a hollow three-dimensional contour surrounded by a flat collar portion, wherein said three-dimensional contour extends outwardly from said first major face and is of sufficient size to cover a surface irregularity in a building or civil construction surface.

2. The pre-formed, shaped waterproofing membrane of claim 1 wherein said carrier support sheet comprises a blend of low density polyethylene and high density polyethylene and said pressure-sensitive waterproofing adhesive layer comprises styrene-isoprene-styrene.

3. The pre-formed, shaped waterproofing membrane of claim 1 wherein said three-dimensional contour has a diameter of 10 cm to 100 cm and a height of 10 cm to 100 cm.

4. The pre-formed, shaped waterproofing membrane of claim 3 additionally comprising a protective coating layer over said pressure-sensitive waterproofing adhesive layer.

5. The pre-formed, shaped waterproofing membrane of claim 1 packaged with a supporting structure, wherein said supporting structure has a three-dimensional contour surrounded by a flat collar portion, and wherein said three-dimensional contour of said supporting structure corresponds with said three-dimensional contour of said shaped waterproofing membrane.

6. The pre-formed, shaped waterproofing membrane of claim 5 wherein said shaped waterproofing membrane has a protective coating layer over said pressure-sensitive waterproofing adhesive layer.

7. A construction waterproofing kit comprising, in a package, a plurality of pre-formed, shaped waterproofing membranes according to claim 1.

8. The construction waterproofing kit of claim 7 additionally comprising a plurality of supporting structures, wherein each supporting structure has a three-dimensional contour surrounded by a flat collar portion, and wherein said three-dimensional contour of said supporting structure corresponds with said three-dimensional contour of said shaped waterproofing membrane.

9. A method of waterproofing a building or civil construction surface having a surface irregularity, comprising applying to said building or civil construction surface over said surface irregularity a pre-formed, shaped waterproofing membrane according to claim 1.

10. The method of claim 9 wherein said three-dimensional contour has a diameter of 10 cm to 100 cm and a height of 10 cm to 100 cm.

11. The method of claim 9 additionally comprising applying to said building or civil construction surface at least one sheet-form waterproofing membrane having a carrier support sheet with first and second opposed major faces and, disposed over said first major face, a pressure-sensitive waterproofing adhesive layer operative to bond with post cast concrete, wherein said flat collar portion of said shaped waterproofing membrane overlaps and forms seams with said at least one sheet-form waterproofing membrane.

12. The method of claim 9 wherein said surface irregularity comprises a tieback and wherein said three-dimensional contour has a dome shape.

13. The method of claim 9 wherein said building or civil construction surface comprises a concrete formwork and said surface irregularity comprises a tieback, pipe or other surface detail, said method comprising adhering at least one sheet-form waterproofing membrane to said concrete formwork, adhering said pre-formed, shaped waterproofing membrane to a portion of said concrete formwork over said tieback, pipe, or other surface detail, and seaming together said at least one sheet-form waterproofing membrane and said pre-formed, shaped waterproofing membrane to provide a continuous waterproofing barrier there between.

14. The method of claim 9 comprising applying a supporting structure over said surface irregularity prior to applying said shaped waterproofing membrane, then applying said shaped waterproofing membrane over said supporting structure, wherein said supporting structure has a three-dimensional contour surrounded by a flat collar portion and said three-dimensional contour corresponds with said three-dimensional contour of said shaped waterproofing membrane.

15. The method of claim 14 wherein said shaped waterproofing membrane has a protective coating layer over said pressure-sensitive waterproofing adhesive layer.

16. The method of claim 14 wherein said building or civil construction surface comprises a formwork and said surface irregularity comprises a tieback.

17. The method of claim 16 additionally comprising applying to said formwork at least one sheet-form waterproofing membrane having a carrier support sheet with first and second opposed major faces and, disposed over said first major face, a pressure-sensitive waterproofing adhesive layer operative to bond with post cast concrete, and seaming said shaped waterproofing membrane to said at least one sheet-form waterproofing membrane.

* * * * *